US010029570B2

(12) United States Patent
Sato et al.

(10) Patent No.: US 10,029,570 B2
(45) Date of Patent: Jul. 24, 2018

(54) DISPLAY APPARATUS

(71) Applicant: NIPPON SEIKI CO., LTD., Niigata (JP)

(72) Inventors: Taisuke Sato, Niigata (JP); Hiroyuki Furusawa, Niigata (JP); Takanori Shigeno, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 156 days.

(21) Appl. No.: 15/027,222

(22) PCT Filed: Oct. 16, 2014

(86) PCT No.: PCT/JP2014/077561
§ 371 (c)(1),
(2) Date: Apr. 4, 2016

(87) PCT Pub. No.: WO2015/060194
PCT Pub. Date: Apr. 30, 2015

(65) Prior Publication Data
US 2016/0243942 A1 Aug. 25, 2016

(30) Foreign Application Priority Data
Oct. 24, 2013 (JP) .................................. 2013-221546

(51) Int. Cl.
*G02B 27/01* (2006.01)
*G02F 1/1333* (2006.01)
(Continued)

(52) U.S. Cl.
CPC .............. *B60K 35/00* (2013.01); *G02B 27/01* (2013.01); *G02B 27/0101* (2013.01);
(Continued)

(58) Field of Classification Search
CPC ........ G02B 27/0149; G02B 2027/0161; G02B 2027/0169; G02B 27/01; G02F 1/133308;
(Continued)

(56) References Cited

U.S. PATENT DOCUMENTS 5,912,769 A * 6/1999 Iizuka ...................... G02B 5/04
359/631

FOREIGN PATENT DOCUMENTS

JP 08-136880 A 5/1996
JP 08136880 A * 5/1996
(Continued)

OTHER PUBLICATIONS

International Application issued in corresponding Application No. PCT/JP2014/077561, dated Nov. 11, 2014.

*Primary Examiner* — Jessica M Merlin
(74) *Attorney, Agent, or Firm* — McDermott Will & Emery LLP

(57) ABSTRACT

Provided is a display apparatus capable of having excellent yield. This display apparatus is provided with: a light source that outputs light for lighting a liquid crystal display element; an optical element (a first light collecting lens or the like) that is disposed on an optical axis of the light source, said optical element being disposed between the light source and the liquid crystal display element; and a case body that houses the optical element. The case body has: an upper opening opened toward the Z axis direction; a bottom section that is positioned on the opposite side to the upper opening in the Z axis direction; and a groove section (a groove section or the like), which is positioned between the upper opening and the bottom section, extends in the Z axis direction, and is recessed in the X axis direction. The optical element has a protruding section (a flange section or the like) that protrudes in the X axis direction, and is housed in the case body in a state wherein the optical element is standing
(Continued)

in the Z axis direction by having the protruding section caught in the groove section.

6 Claims, 10 Drawing Sheets

(51) Int. Cl.
*G02F 1/1335* (2006.01)
*B60K 35/00* (2006.01)

(52) U.S. Cl.
CPC ... *G02B 27/0149* (2013.01); *G02F 1/133308* (2013.01); *G02F 1/133603* (2013.01); *G02F 1/133604* (2013.01); *G02F 1/133605* (2013.01); *G02F 1/133606* (2013.01); *G02F 1/133608* (2013.01); *G02F 1/133611* (2013.01); *B60K 2350/203* (2013.01); *G02F 2001/133607* (2013.01); *G02F 2201/46* (2013.01); *G02F 2201/503* (2013.01)

(58) Field of Classification Search
CPC ........ G02F 2001/133322; G02F 2001/133325; G02F 2001/133607; G02F 2201/46; G02F 2201/503
See application file for complete search history.

(56) References Cited

FOREIGN PATENT DOCUMENTS

| | | | |
|---|---|---|---|
| JP | 09-146090 | A | 6/1997 |
| JP | 09-159986 | A | 6/1997 |
| JP | 09159986 | A * | 6/1997 |
| JP | 2010-276776 | A | 12/2010 |
| JP | 2011-191723 | A | 9/2011 |

* cited by examiner (a)

(b)

DISPLAY APPARATUS

CROSS REFERENCE

This application is the U.S. National Phase under 35 U.S.C. § 371 of International Application No. PCT/JP2014/077561, filed on Oct. 16, 2014, which claims the benefit of Japanese Application No. 2013-221546, filed on Oct. 24, 2013, the entire contents of each are hereby incorporated by reference.

TECHNICAL FIELD

The present invention relates to a display apparatus.

BACKGROUND ART

Conventionally, as a display to display an image, there is known the one configured to transmit and illuminate a liquid crystal display element with backlight. In Patent Literature 1, a display apparatus referred to as a so called head-up display device, which is provided with the display of such a configuration, is disclosed. The head-up display device projects display light from the display to a predetermined transparent member (for example, a front glass of a vehicle) to thereby cause a user to visually recognize a display image of the display as a virtual image.

The display apparatus according to Patent Literature 1 is provided with: a light source to illuminate a liquid crystal display element; a scattering member as an optical element which is positioned between a light source and the liquid crystal display element; a first lens member; and a second lens member (refer to FIG. 6 of the same Literature). This display apparatus is configured to fix optical elements so as to be stacked in sequential order to a first case body and then cover an opening which is provided at the liquid crystal display element's side of a first case body, at a second case body.

CITATION LIST

Patent Literature

Patent Literature 1: Japanese Patent Application Publication No. 2011-191723

SUMMARY OF THE INVENTION

Problems to be Solved by the Invention

In a structure of the display apparatus according to Patent Literature 1, in the case of carrying out check after assembling, the only way to do is a visual check through an opening to open toward a stacking direction of a plurality of optical elements, and thus, it has been not easy to find faults or incorrect assembling of components. Also, in the structure of the display apparatus according to Patent Literature 1, it has been general to secure each of the optical elements to a case body with screw, and thus, assembling itself has not been easy. If assembling is not easy, and finding of faults or the like of the constituent elements is not easy, there is an apprehension that yielding lower.

The present invention has been made in view of the circumstance described above, and it is an object of the present invention to provide a display apparatus which is capable of having excellent yield.

Means for Solving the Problem

A display apparatus to emit the display light representative of an image which is displayed by the liquid crystal display element towards a transparent member and then display a virtual image of the image by the display light that is reflected by the transparent member, the display apparatus comprising: a light source to emit light which illuminates the liquid crystal display element from an opposite side to the display side of the image; an optical element which are disposed between the light source and the liquid crystal display element and on the optical axis of the light source and a case body to house the optical elements, wherein the case body having: an opening which opens toward a first axial direction substantially orthogonal to the optical axis; a bottom section which is positioned on an opposite side to the opening in the first axial direction; groove sections, each of which is positioned between the opening and the bottom section, extends along the first axials direction, and is hollowed in a second axial direction orthogonal to the optical axis and the first axis, wherein the optical element has a protrusion section which protrudes in the X-axis direction, and wherein the protrusion section is sandwiched between the groove sections, and is thereby housed in the case body while standing along the first axial direction.

Effect of the Invention

According to the present invention, it is possible to have excellent yield.

MODE FOR CARRYING OUT THE INVENTION

A display apparatus according to an embodiment of the present invention will be described with reference to the drawings.

Figure 1:
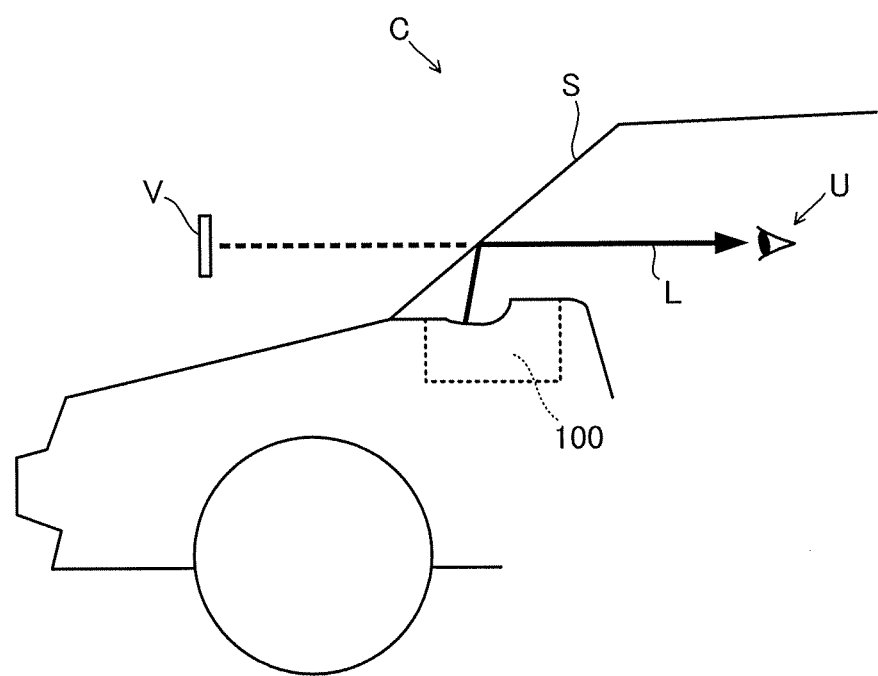
FIG. 1 is a schematic view for explaining a mounting mode of a display apparatus according to an embodiment of the present invention.
Figure 2:
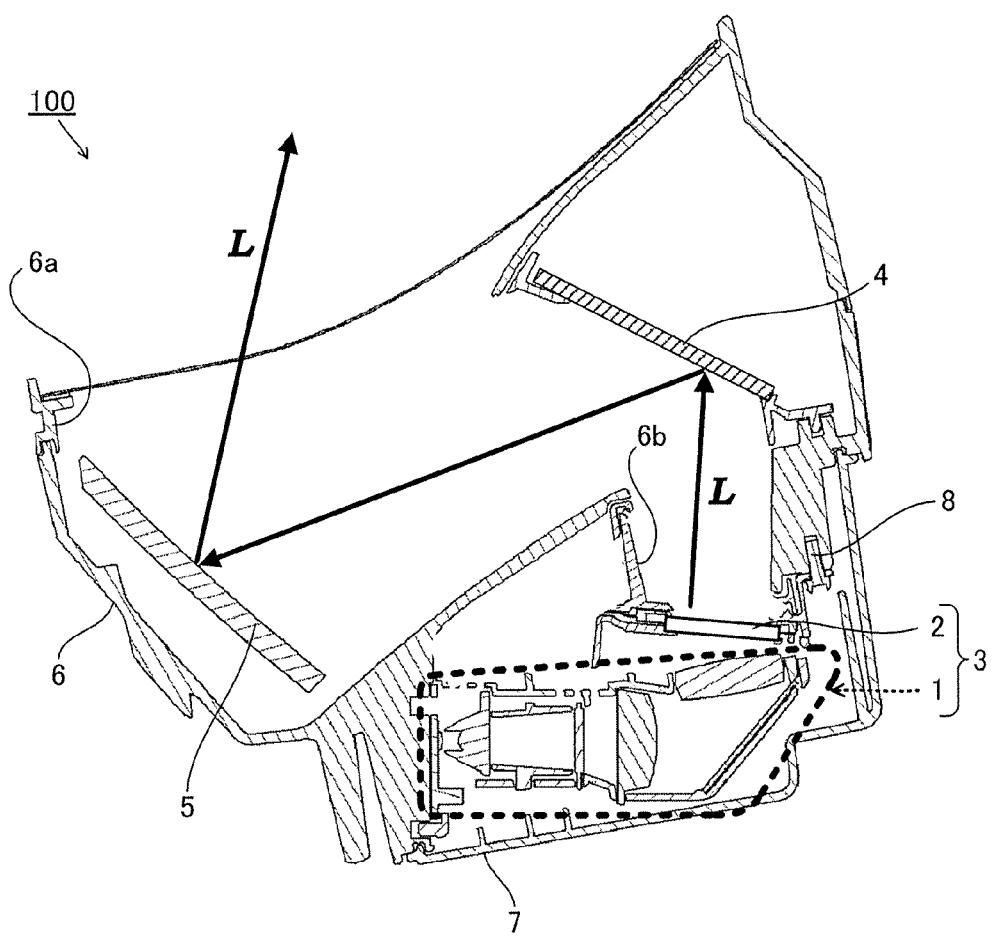
FIG. 2 is a schematic sectional view of the display apparatus according to the embodiment of the present invention.

A display apparatus 100 according to the embodiment, as shown in FIG. 1, is constructed as a head-up display device. The display apparatus 100 is provided so as to be embedded in a dashboard of a vehicle C, and as shown in FIG. 2, is provided with: a display 3 which is composed of a backlight unit 1 and a liquid crystal display element 2; a planar mirror 4; a concave mirror 5; a casing 6; and a protection member 7.

The display apparatus 100 projects display light L from the display 3 to a windshield S (a front glass) of the vehicle C to cause a user U (mainly, a driver) to visually recognize an image which is represented by the display light L as a virtual image V. The display light L that is emitted from the display 3 is obtained by the liquid crystal display element 2 being transmitted and illuminated with light from the backlight unit 1, and represents a predetermined image.

(Backlight Unit)

Figure 3:
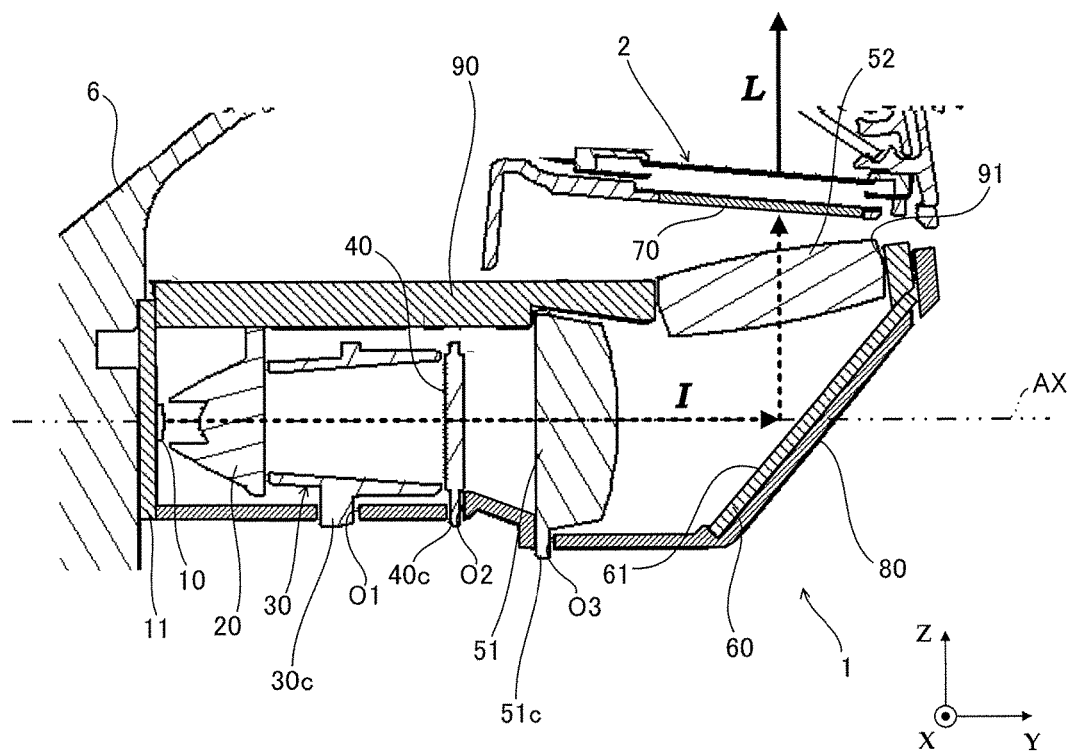
FIG. 3 is an enlarged view of a close vicinity of a display of the display apparatus shown in FIG. 2.

The backlight unit 1, as shown in FIG. 3, is provided with: a light source 10; parallel light generating means 20; a light box 30; a lens array 40; a first light collecting lens 51; a second light collecting lens 52; a reflection section 60; a scattering plate 70; a case body 80; and a covering body 90.

The parallel light generating means 20, the light box 30, the lens array 40, the first light collecting lens 51, the second light collecting lens 52, the reflection section 60, and the scattering plate 70 are disposed on an optical path of light which is emitted by a light source 10. These constituent elements are disposed from the light source 10 toward the liquid crystal display element 2 in sequential order of the parallel light generating means 20, the light box 30, the lens array 40, the first light collecting lens 51, the reflection section 60, the second light collecting lens 52, and the scattering plate 70. Among them, the parallel light generating means 20, the light box 30, the lens array 40, and each optical element of the first light collecting lens 51 are positioned on an optical axis AX (refer to FIG. 3) of the light source 10.

The light source 10 emits light to transmit and illuminate the liquid crystal display element 2 (hereinafter, referred to as illumination light I as well). The light source 10 is composed of one or a plurality of LEDs (Light Emitting Diode(s)), for example. The light source 10 is mounted to a circuit board 11 (refer to FIG. 4) which is fixed to the case body 80. In so far as the circuit board 11 is concerned, a circuit pattern is formed on a substrate made of aluminum or a resin or the like, and this board is connected for continuity to a control section (not shown), which will be described later, by a publicly known technique.

The parallel light generating means 20 receives illumination light I from the light source 10, and emits the received light as parallel light. The parallel light as used herein is light which travels substantially (It also includes a just parallel) in parallel to an optical axis AX of the light source 10. The parallel light generating means 20 is made of a condenser lens, for example. As the parallel light generating means 20, another publicly known optical element such as a collimating lens may be employed.

The light box 30 is a box to which the illumination light I obtained as parallel light by the parallel light generating means 20 is incident, and is intended to uniform the distribution of the luminous intensity of the light at the emission side. The light box 30 is in a shape of a rectangular cylinder which surrounds the optical axis AX, and an interior face thereof is a mirror face. In addition, the light box 30 has flange sections 30a, 30b and a positioning section 30c (refer to FIG. 7 (b)). These constituent elements will be described later.

The lens array 40 is a lens body obtained by vertically and transversely arranging single lens in plurality, and is referred to as a so called fly eye lens. The lens array 40 is a so called biconvex lens in which both faces at the light source 10 side and the liquid crystal display element 2 side are convex, for example. To the lens array 40, the illumination light I is incident such that the luminous intensity is substantially uniformed by the light box 30. The lens array 40 generates multiple images by the number of lenses constituting the array itself and thus images of one light source 10 are obtained as multiple images by the number of lenses of the lens array 40. In this manner, even if the number of light source 10 is small, the liquid crystal display element 2 can be illuminated at a homogenous distribution of luminous intensity.

Figure 9:
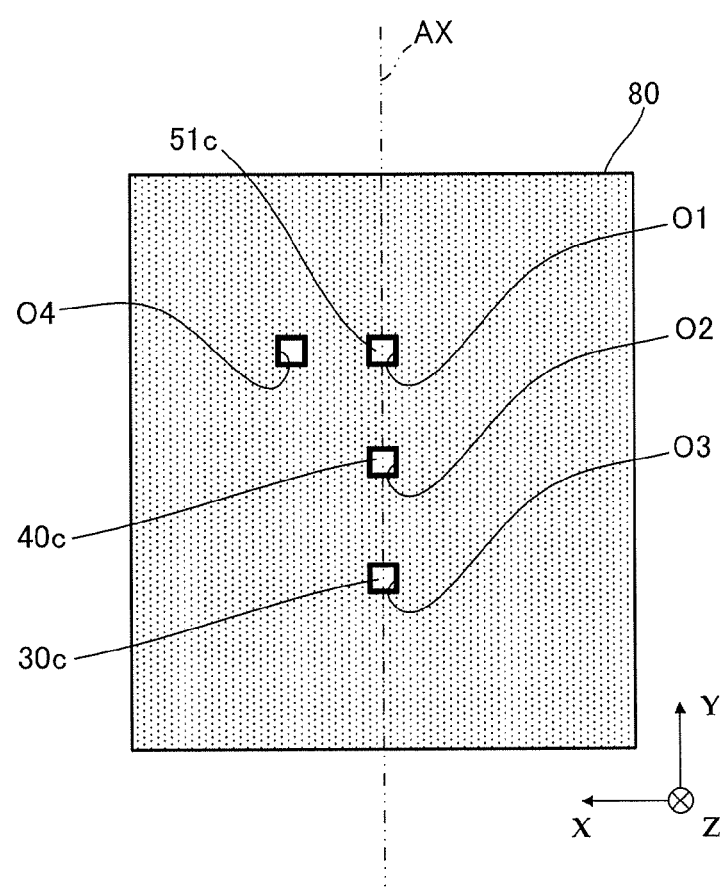
FIG. 9 is a schematic rear view of the backlight unit according to the embodiment of the present invention.

Also, the lens array 40 has a flange section 40b (refer to FIG. 4) and a positioning section 40c (refer to FIG. 9). These constituent elements will be described later.

Figure 5:
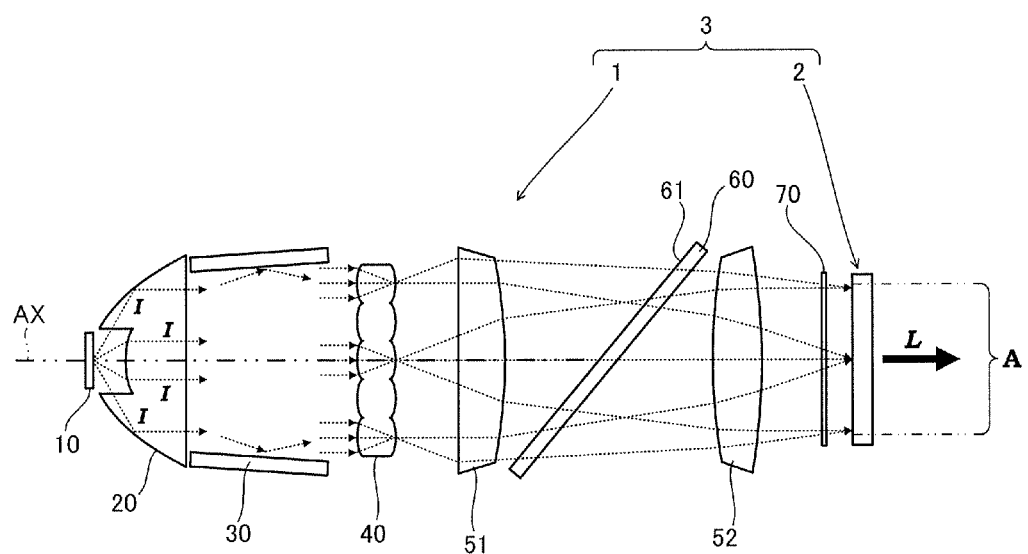
FIG. 5 is a schematic view for explaining functions of the backlight unit according to the embodiment of the present invention.

The first light collecting lens 51 and the second light collecting lens 52 function as light collecting means for collecting light so as to correspond to a display region A of the liquid crystal display element 2 (refer to FIG. 5). Specifically, the first light collecting lens 51 and the second light collecting lens 52 cooperatively emit the illumination light I from the lens array 40 all over the rear face corresponding to a displayable range (the display region A) of an image which is displayed on a front face of the liquid crystal display element 2 (the face oriented upward on sheet in FIG. 2 and FIG. 3). In this manner, the illumination light I representative of the multiple images that are generated at the lens array 40 can be efficiently emitted in a required range of the rear face of the liquid crystal display element 2.

The first light collecting lens 51 and the second light collecting lens 52 are made of acrylic lenses, for example, and at least one of them is composed of a toroidal lens. Namely, of the four faces made of both faces of the first light collecting lens 51 and both faces of the second light collecting lens 52, at least one face is composed of the toroidal lens. In this manner, the illumination light I having passed through the first light collecting lens 51 and the second light collecting lens 52 is optically distributed in a rectangular shape and thus this light is efficiently emitted to the liquid crystal display element 2 in accordance with the shape of the display region A of the liquid crystal display element 2 that is generally often formed in a rectangular shape.

Figure 7:
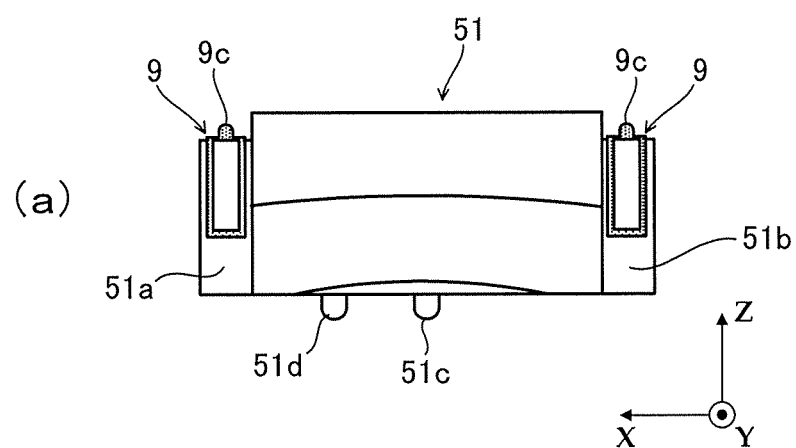
FIG. 7 is a view showing an optical element when seen in a direction in which an optical axis of a light source is oriented, wherein FIG. 7 (*a*) shows a first light collecting lens, and FIG. 7 (*b*) is a view showing a light box.
Figure 7:
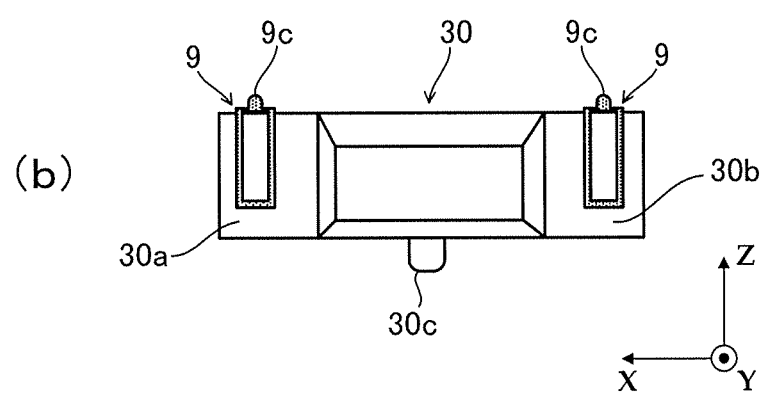

In addition, the first light collecting lens 51 has flange sections 51a, 51b and a positioning section 51c (FIG. 7 (a)). These constituent elements will be described later.

The reflection section 60 is disposed between the first light collecting lens 51 and the second light collecting lens 52. The reflection section 60 is composed of a planar mirror in which a reflection surface 61 is formed by vapor-depositing a metal such as aluminum on a substrate made of a resin, a glass or the like, for example. The reflection section 60 is disposed so that the reflection surface 61 is inclined with respect to the optical axis AX of the light source 10. The illumination light I from the first light collecting lens 51 is reflected on this reflection surface 61, and is incident to the second light collecting lens 52. In the embodiment, as shown in FIG. 3, the reflection section 60 is disposed so that an optical path of the illumination light I from the reflection section 60 leading up to the liquid crystal display element 2 is substantially orthogonal to the optical axis AX of the light source 10. In this manner, the reflection section 60 varies the optical path of the illumination light I.

The scattering plate 70 is made of a synthetic resin material in which irregularity processing is made for at least one face, and has light transmissibility. The illumination light I from the second light collecting lens 52 is scattered by passing through the scattering plate 70, and reaches the rear face of the liquid crystal display element 2. Thus, the scattering plate 70 is provided, and the non-uniformity of the illumination of the liquid crystal display element 2 is reduced as much as possible.

Figure 4:
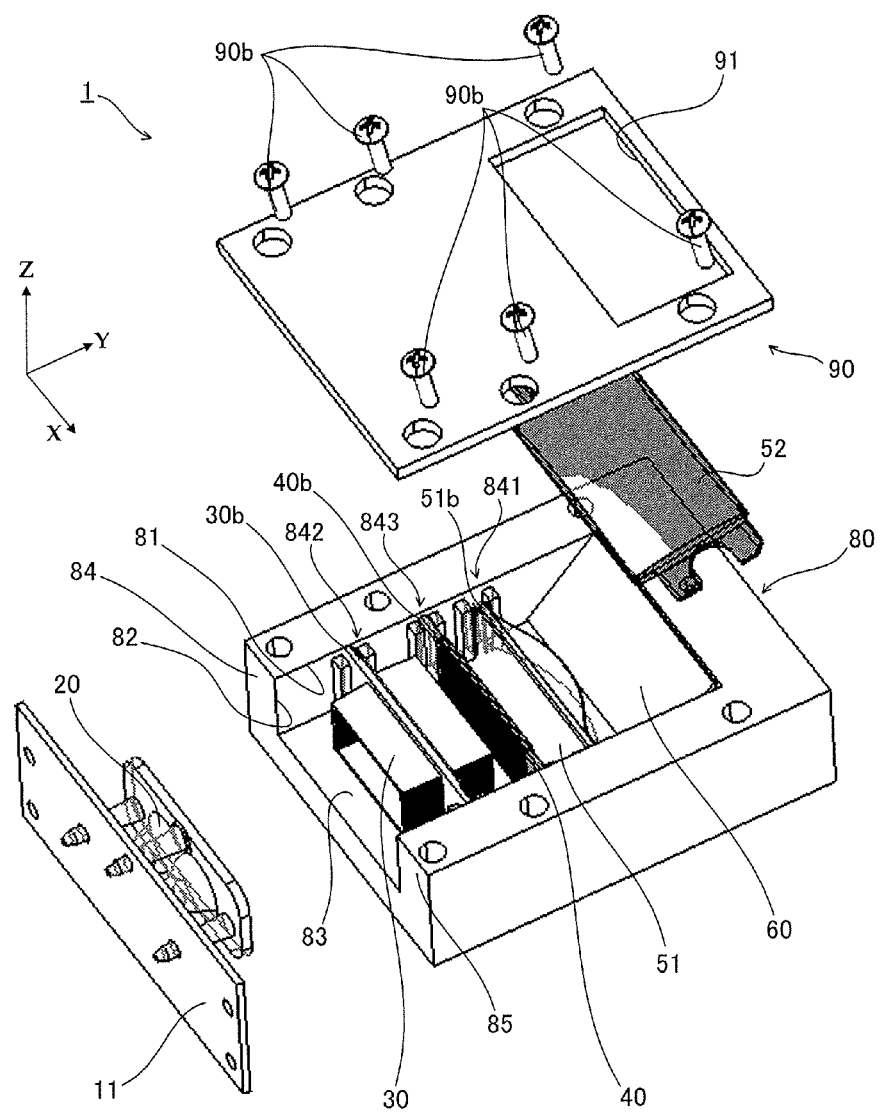
FIG. 4 is an exploded schematic and perspective view of a backlight unit according to an embodiment of the present invention.

The case body 80 is formed of a resin or the like in a box shape, and houses the light source 10, the parallel light generating means 20, the light box 30, the lens array 40, the first light collecting lens 51, and the reflection section 60. The case body 80, as shown in FIG. 4, has an upper opening 80 (an opening) and a side opening 82. The upper opening 81 opens toward the liquid crystal display element 2 side. The side opening 82 opens toward the light source 10 side. The upper opening 81 and the side opening 82 communicate with each other. The circuit board 11 is provided so as to close the side opening 82. The circuit board 11 is fixed to the case body 80 by fixing means (not shown) such as screw. In this manner, the light source 10 is disposed so as to emit light toward the inside of the case body 80. Of the upper opening 81, the second light collecting lens 52 is provided so as to cover an opposite end part to the light source 10. It is to be noted that a detailed description of a structure of the case body 10 will be given later.

The covering body 90, as shown in FIG. 4, is formed of a resin or the like in a plate shape, and covers the upper opening 81 of the case body 80. The covering body 90 is fixed to the case body 80 by fixing means such as a screw 90b. In the covering body 90, an opening 91 through which the second light collecting lens 52 can be seen is formed. The opening 91 is in a shape corresponding to a lens surface shape of the second light collecting lens 52.

(Liquid Crystal Display Element)

The liquid crystal display element 2 is constructed by providing a polarizing plate on a front face and a rear face of a TFT (Thin Film Transistor)-type liquid crystal panel, for example. It is to be noted that a liquid crystal panel constituting the liquid crystal display element 2 may be a passive driven type. Also, as the liquid crystal panels, various kinds of panels such as those of TN (Twisted Nematic)-type, VA (Vertical Alignment)-type, STN (Super-Twisted Nematic)-type, ferroelectric-type can be applied.

The liquid crystal display element 2 switches each pixel to either of a transmissive state and a non-transmissive state under the control of a control section (not shown) to thereby display a predetermined image. For example, the control section acquires various items of vehicle information which are transmitted from an ECU (an Electronic Control Unit) of the vehicle C and then causes the liquid crystal display element 2 to display an image indicative of vehicle speed or fuel consumption or the like. At the same time, the control section causes the light source 10 to emit light. In this manner, the liquid crystal display element 2 is transmitted and illuminated with the illumination light I that is generated by the backlight unit 1, and the display light L representative of a display image is emitted from the liquid crystal display element 2. In this manner, the display light L is emitted from the display 3 composed of the backlight unit 1 and the liquid crystal display element 2.

(Planar Mirror, Concave Mirror, Casing, and Protection Member)

By turning to FIG. 2, the planar mirror 4 forms, and is made of, a reflection surface by vapor-depositing a metal such as aluminum on a substrate made of a resin, a glass or the like. The planar mirror 4 reflects the display light that is emitted by the display 3, toward the concave mirror 5.

The concave mirror 5 forms, and is made of, a reflection surface by vapor depositing a metal such as aluminum on a substrate made of a resin, a glass or the like. A reflection surface of the concave mirror 5 is obtained as a concave face, and the display light L from the display 3 is expanded and then is projected to the windshield S. In this manner, the virtual image V that is visually recognized by the user U is the same in size of which the image displayed on the display 3 is expanded.

The casing 6 is formed of a resin or the like in a box shape, and houses the planar mirror 4 and the concave mirror 5 therein. The planar mirror 4 and the concave mirror 5 are fixed to the inside of the casing 6 by a publicly known technique. The casing 6, as shown in FIG. 2, has an upper opening 6a and a lower opening 6b. The upper opening 6a opens toward the windshield S, and functions as an emission port which causes the display light L to pass to the outside of a display apparatus 100. The lower opening 6b is positioned at an opposite side to the upper opening 6a of the casing 6, and the liquid crystal display element 6 is disposed at a lower end part thereof (at the end part in the downward direction of the sheet of FIG. 2). In this manner, the lower opening 6b is formed so that a display face of the liquid crystal display element 2 is seen toward the inside of the casing 6. Thus, the casing 6 is formed so as to surround the optical path of the display light L from the liquid crystal display element 2 leading up to the upper opening 6a that functions as the emission port.

As shown in FIG. 2, the backlight unit 1 is outside of the casing 6, and is mounted to the casing 6 from the lower opening 6b side. For example, the case body 80 is fixed to the casing 6 by way of fixing means such as a screw 8 (refer to FIG. 2), for example, and the backlight unit 1 is thereby mounted to the casing 6. At this juncture, the backlight unit 1 is mounted so that the opening 91 (refer to FIG. 4) of the covering body 90 to cover the case body 80 communicates with the lower opening 6b (refer to FIG. 2) of the casing 6.

The protection member 7 is made of a resin or the like, and is fixed to the casing 6 by a predetermined method so as to cover the backlight unit 1 that is mounted to the casing 6 from a lower side (the lower side of the sheet of FIG. 2). The thus provided protection member 7 protects the backlight unit 1 from dust, vibration or the like.

If a mechanism in which the display apparatus 100 enables the user U to visually recognize the predetermined image as the virtual image V is briefly described, it is followed by items (1) and (2).

(1) The display 3 displays an image, and the display light L is thereby emitted. The display light L from the display 3 is reflected on the planar mirror 4 and the concave mirror 5, and travels to the windshield S. In this way, the display apparatus 100 emits the display light L toward the windshield S.

(2) The display light L from the display apparatus 100 is reflected on the windshield S, and the virtual image V is thereby formed in front of the windshield S when seen from the user U.

In the display apparatus 100 described above, a plurality of optical elements (the light box 30, the lens array 40, and the first light collecting lens 51) which is positioned to be arrayed on the optical axis AX of the light source 10 are arranged in the case body 80 in a structure specific to the embodiment.

Hereinafter, for the sake of clear understanding of this structure, as shown in FIG. 4 or the like, a description will be given by employing an XYZ coordinate system in which an axis parallel to the optical axis AX of the light source 10 is the Y-axis; an axis taken along a direction in which the respective optical elements (the light box 30, the lens array 40, and the first light collecting lens 51) stand is the Z-axis (a first axis); and an axis orthogonal to the Y-axis and the Z-axis is the X-axis (a second axis). It is to be noted that, in the figure, conveniently, a description will be given assuming that the direction pointed by the arrow indicating each of the X-axis, the Y-axis, and the Z-axis is a positive direction of each of these axes, and the opposite direction is a negative direction of each of these axes.

(Structure of Arrangement of Optical Elements in Case Body)

At each of the optical elements that are positioned on the optical axis AX, a pair of flange sections and a positioning section are provided. Specifically, as shown in FIG. 7 (a), at the first light collecting lens 51, a flange section 51a which protrudes to the +X direction side and a flange section 51b which protrudes to the −X direction side is provided. Also, at the first light collecting lens 51, a positioning section 51c which protrudes in the −Z direction is provided. In addition, at the first light collecting lens 51, an incorrect assembling prevention section 51d which is positioned at predetermined intervals in the X-axis direction to be spaced from the positioning section 51c, and which protrudes in the −Z direction, is provided. As shown in FIG. 7 (b), at the light box 30, a flange section 30a which protrudes in the +X direction side and a flange section 30b which protrudes to the −X direction side are provided. Also, at the light box 30, a positioning section 30c which protrudes in the −Z direction is provided. At the lens array 40 also, a pair of flange sections are provided similarly (a flange section 40b which protrudes in the −X direction was shown in FIG. 4), and a positioning section 40c which protrudes in the −Z direction is provided.

The case body 80, as described previously, has an upper opening 81 which opens in the Z-axis direction (refer to FIG. 4). Of the case body 80, at the opposite side to the upper opening 81 in the Z-axis direction, a bottom section 83 is positioned. Also, from both ends in the X-axis direction of the bottom section 83, wall sections 84, 85 standing toward the +Z-axis direction, and opposing to each other, are formed. In a space surrounded by the bottom section 83, the wall section 84, and the wall section 85, the respective optical elements (the light box 30, the lens array 40, and the first light collecting lens 51) are positioned.

In the wall sections 84, 85 of the case body 80, groove sections which correspond to the pair of flange sections of each of the optical elements are formed. Here, the groove sections that correspond to the first light collecting lens 51 will be described with reference to FIG. 4 and FIG. 6. It is to be noted that FIG. 6 is a view mainly illustrating the groove sections corresponding to the first light collecting lens 51.

On an interior face of the wall section 84 that is positioned at the −X direction side (the face opposing to the wall section 85), a groove section 841 is formed. The groove section 841 extends along the Z-axis direction, and is hollowed in the −X-axis direction. The groove section 841 is formed so as to sandwich the flange section 51b of the first light collecting lens 51 in the Y-axis direction. On an interior face of the wall section 85, the groove section 841 is paired, and the groove sections (not shown) to sandwich the flange section 51a of the first light collecting lens 51 are formed similarly. The flange sections 51a, 51b are sandwiched between the pair of the flange groove sections thus formed, and the first light collecting lens 51 is in a standing (erected) state along the Z-axis direction. The groove section 841, as shown in FIG. 6, is formed so as to provide a slight space (a gap in the Y-axis direction) from the flange section 51b.

Figure 6:
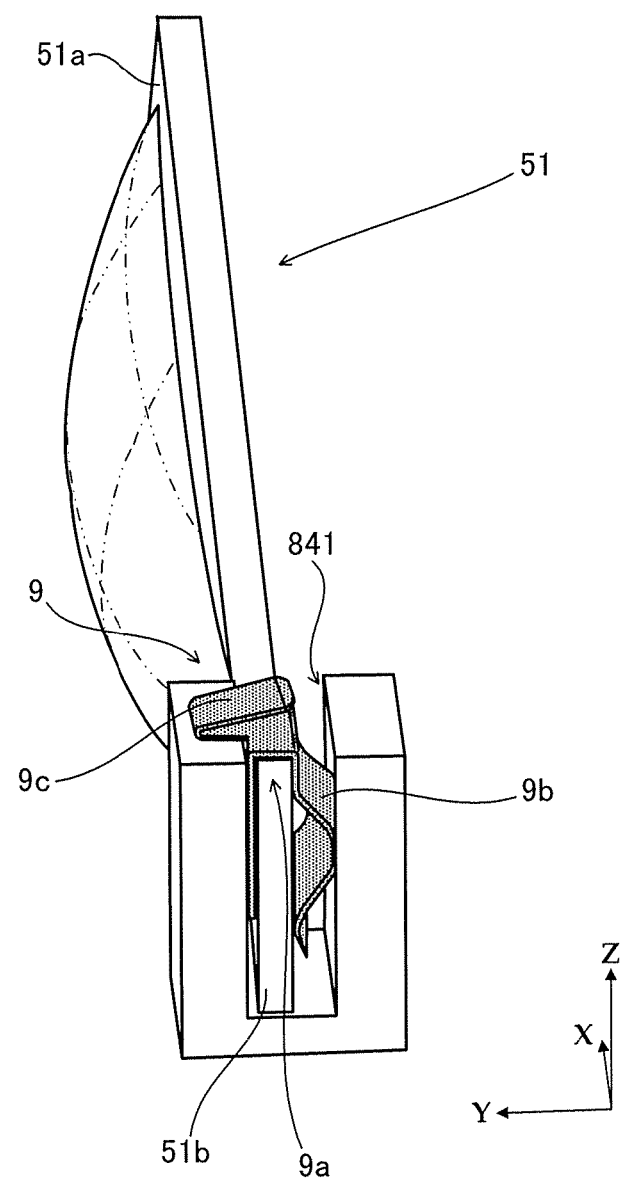
FIG. 6 is a view for explaining a relationship between a groove section and a spring body which are respectively formed at a first focusing lens and a case body.
Figure 8:
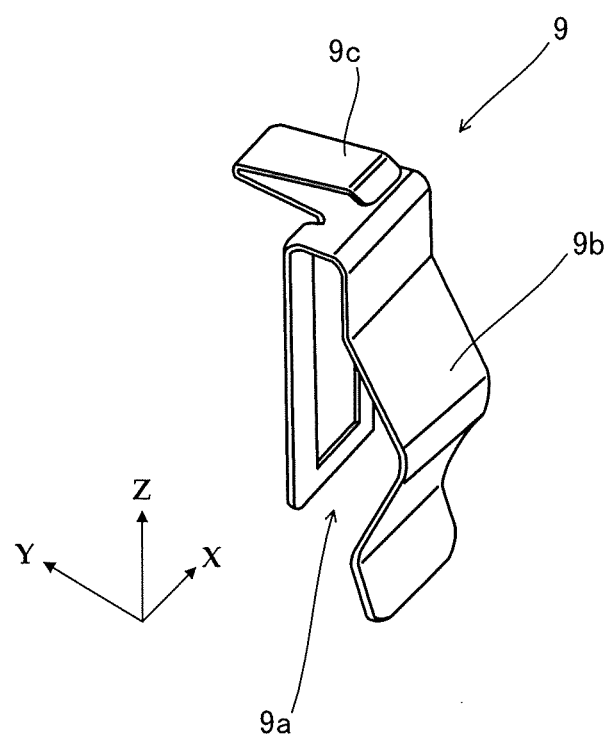
FIG. 8 is a perspective view of the spring body.

At the flange section 51b, a spring body 9 shown in FIG. 6 and FIG. 8 or the like is provided. The spring body 9 is made of a metallic spring, for example, and is provided with: sandwiching sections 9a to sandwich the flange section 51b therebetween; a first elastic section 9b, having a resilient force in the Y-axis direction; and a second elastic section 9c, having a resilient force in the X-axis direction.

The spring body 9 is mounted to the first light collecting lens 51 by inserting the flange section 51b into the sandwiching sections 9a. In a state in which the spring body 9 has been mounted to the flange section 51b, the first elastic section 9b, as shown in FIG. 6, protrudes in the −Y direction, and abuts against the groove section 841. The first elastic section 9b is positioned between the flange section 51b and the groove section 841, and by the resilient force in the Y-axis direction, the flange section 51b is pressed against the groove section 841. Also, in the state in which the spring body 9 has been mounted to the flange section 51b, the second elastic section 9c, as shown in FIG. 6, protrudes in the +Z direction. Here, as described previously, to the case body 80, a covering body 90 to close the upper opening 81 is mounted. When the covering body 90 is mounted to the case body 80, the second elastic section 9c abuts against a face at the −Z direction side of the covering body 90. In this manner, the second elastic section 9c is positioned between the flange section 51b and the covering body 90, and by the resilient force in the Z-axis direction, the flange section 51 is pressed against the bottom section 83. Similarly, as shown in FIG. 7 (a), the spring body 9 is provided at the flange section 51a as well.

In this manner, the first light collecting lens 51 is positioned with respect to the case body 80 in the Y-axis direction and Z-axis direction while having a vibration proofing property by the elastic force of the spring body 9. It is to be noted that, in FIG. 3 and FIG. 4 described previously, the spring body 9 is not shown in consideration of easiness to look.

Similarly, corresponding to the light box 30, as shown in FIG. 4, in the wall section 84, a groove section 842 to sandwich the flange section 80b is formed, and corresponding to the flange section 30a (refer to FIG. 7 (b)), in the wall section 85, a groove section (not shown) to sandwich the flange section 30a, which is paired with the groove section 842, is formed. In addition, as shown in FIG. 7 (b), to each of the flange sections 30a, 30b of the light box 30 as well, the spring body 9 is mounted.

Similarly, corresponding to the lens array 40, as shown in FIG. 4, in the wall section 84, a groove section 843 to sandwich the flange section 40 is formed, and corresponding to a flange section (not shown) which is paired with the flange section 40b, in the wall section 85, a groove section (not shown) which is paired with the groove section 843 is formed. In addition, although not shown, each of a pair of flange sections of the lens array 40 as well, the spring body 9 is attached. In this manner, the respective optical elements are positioned with respect to the case body 80 in the Y-axis and the Z-axis directions while having a vibration proofing property by the elastic force of the spring body 9.

FIG. 9 shows a rear view of the backlight unit 1 (the view when seen in the −Z direction).

In the bottom section 83 of the case body 80 (refer to FIG. 4), corresponding to positioning section 51c, 40c, 30c of the respective optical elements, positioning holes O1, O2, O3 (positioned sections) in which the respective positioning sections are positioned with respect to the case body 80 are formed. The positioning holes O1, O2, O3 penetrate the bottom section 83 in the Z-axis direction. The positioning section 51c is inserted into the positioning hole O1, and both of them are engaged with each other, and the first light collecting lens 51 is thereby positioned with respect to the case body 80 mainly in the X-axis direction. The positioning section 40c is inserted into the positioning hole O2, and both of them are engaged with each other, and the lens array 40 is thereby positioned with respect to the case body 80 mainly in the X-axis direction. The positioning section 30c is inserted into the positioning hole O3, and both of them are engaged with each other, and the light box 30 is thereby positioned with respect to the case body 80 mainly in the X-axis direction. Also, as described previously, the respective optical elements are positioned in the Y-axis and Z-axis direction at the groove section and spring body 9 that are provided at the case body 80. In this way, the respective optical elements are positioned in the XYZ direction with respect to the case body 80.

In addition, as shown in FIG. 9, the positioning holes O1, O2, O3 are positioned on the optical axis AX of the light source 10. Namely, the positioning sections 51c, 40c, 30c that are inserted into these holes are also positioned on the optical axis AX. With this construction, it is possible to restrain a displacement between a center position of each optical element and the optical axis AX. For example, the positioning section 51c is provided so as to be positioned on a lens optical axis of the first light collecting lens 51 when seen in the Z-axis direction, and restrains a displacement between the lens optical axis of the first light collecting lens 51 and the optical axis AX of the light source 10.

Further, as shown in FIG. 9, in the bottom section 83 of the case body 80, an incorrect assembling prevention hole O4 which corresponds to the incorrect assembling prevention section 51d of the first light collecting lens 51 is formed. The incorrect assembling prevention hole O4 penetrates the bottom section 83 in the Z-axis direction. The incorrect assembling prevention hole O4 is positioned at predetermined intervals in the X-axis direction to be spaced from the positioning hole O1. At the time of assembling, unless the first light collecting lens 51 is disposed so that the incorrect assembling prevention section 51d is inserted into the incorrect assembling prevention hole O4, the first light collecting lens 51 is lifted from the bottom section 83 of the case body 80, and it is found that the first light collecting lens 51 is opposite to a desired direction. In this manner, incorrect assembling of the first light collecting lens 51 can be prevented. Incidentally, it may be that similar incorrect assembling prevention sections are respectively provided at the light box 30 and the lens array 40 as well, and an incorrect assembling prevention hole is provided in the case body 80 correspondingly.

Figure 10:
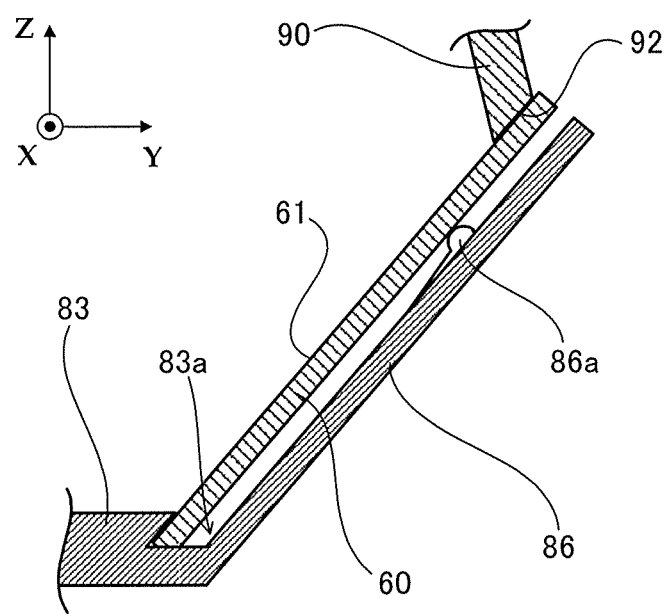
FIG. 10 is a schematic sectional view for explaining a structure in which a reflection section is arranged at the case body.

From now on, with reference to FIG. 10, a structure in which the reflection section 60 is arranged at the case body 80 will be described. As shown in FIG. 10, at an end part of the +Y direction side of the case body 80, an inclined section 86 is formed. At an interior face side of the case body 80 of the inclined section 86, a resin spring section 86a which is integrally formed with the inclined section 86 is formed. Also, at an end part of the bottom section 83 side of the inclined section 86 of the case body 80, a groove section 83a is formed. The reflection section 60 is temporarily secured to the case body 80 by an end part at the −Z direction side being inserted into the groove section 83a. At the −Z direction side of the end part at the +Y direction side of the covering body 90, an inclined face 92 is formed. This inclined face 92 abuts against the end part at the +Z direction side of the reflection section 60 and then presses the reflection section 60 against the inclined section 86 of the case body 80 if the covering body 90 is mounted to the case body 80. On the other hand, the resin spring section 86a that is formed at the inclined section 86 is formed to have a resilient force in a normal direction of a reflection surface 61 of the reflection section 60, and if the reflection section 60 is pressed by the covering body 90, the reflection section 60 is pressed to the opposite side, namely, towards the covering body 90. The end part at the −Z direction side of the reflection section 60 is supported by the groove section 83a and thus the reflection section 60 is arranged with respect to the case body 80 by maintaining a good balance between a force from the inclined face 92 of the covering body 90 and a force from the resin spring section 86a which act with each other in an opposite direction while the end part at the −Z direction side is employed as a supporting point. It is to be noted that the inclined face 92 of the covering body 90 and the inclined section 86 and the groove section 83a of the case body 80 are set so that the reflection surface 61 of the reflection section 60 is inclined as desired. In this way, the reflection section 60 is arranged at the case body 80 while having a vibration proofing property by an elastic force of the resin spring section 86a. Incidentally, in the embodiment, the reason why an elastic member to impart the vibration proofing property to the aforementioned respective optical elements (the first light collecting lens 51, the lens array 40, the light box 30) was employed as a metal spring in place of the resin spring is that the respective optical elements are comparatively close to the light source 10 and thus deformation or the like of a member due to a temperature rise in a close vicinity of the light source 10 is disallowed to arise. Therefore, from the viewpoint of satisfying the vibration proofing property, the spring body 9 can be formed of a resin spring, and the elastic member to abut against the reflection section 60 can be formed of a metal spring separately from the case body 80.

The display apparatus 100 described hereinabove is directed to a display apparatus 100 to emit the display light L representative of an image which is displayed by the liquid crystal display element 2 towards a transparent member (the windshield S as an example) and then display the virtual image V of the image by the display light L that is reflected by the transparent member, the display apparatus being provided with: a light source 10 to emit light which illuminates the liquid crystal display element 2 from an opposite side to the display side of the image; optical elements (the first light collecting lens 51, the lens array 40, the light box 30) which are disposed between the light source 10 and the liquid crystal display element 2 and on the optical axis of the light source 10; and a case body 80 to house the optical elements, the case body 80 having: an upper opening 81 which opens toward the Z-axis direction; a bottom section 83 which is positioned on an opposite side to the upper opening 81 in the Z-axis direction; and groove sections (the groove sections 841, 842, 843) which are positioned between the upper opening 81 and the bottom section 83, which extends along the Z-axis direction, and which is hollowed in the X-axis direction, wherein the optical elements respectively have protrusion sections (the flange sections 51a, 51b, 30a, 30b or the like) which protrude in the X-axis direction, wherein the protrusion sections are sandwiched between the groove sections, and are thereby housed in the case body 80 while standing along the Z-axis direction. By doing so, it is possible to check whether the optical elements are appropriately arranged, merely by seeing through the upper opening 81 after assembling of the optical elements and thus it is possible to have excellent yield. Also, the optical elements can be disposed in the case body 80 by inserting them along the groove sections that are formed in the case body 80 and thus assembling is easy. This construction is effective, in particular, in a case where a plurality of optical elements are present.

In addition, the display apparatus 100 is further provided with: a covering body 90 to close the upper opening 81; a first elastic section 9b which is positioned between a protrusion section and a groove section, and which presses the protrusion section against the groove section; and a second elastic section 9c which is positioned between the protrusion section and the covering body 90, and which presses the protrusion section against the bottom section 83. By doing so, although assembling of the optical elements is easy, the vibration proofing property can be imparted to the optical elements by the elastic forces of the first elastic section 9b and the second elastic section 9c.

Further, at the bottom section 83 side of each of the optical elements, a positioning section (the positioning section 51c or the like) is provided; at the bottom section 83, there is provided a positioned section (the positioning hole O1 or the like) in which the positioning section is to be positioned; and the positioning section and the positioned section are positioned on the optical axis X when seen in the Z-axis direction. By doing so, it is possible to restrain displacement between the center position of the optical element and the optical axis AX.

Furthermore, there are a plurality of optical elements at intervals in the direction in which the optical axis AX is oriented, and at least one of them is the first light collecting lens 51 to collect the light that is emitted by the light source 10 so as to correspond to the display region A of the liquid crystal display element 2, and a plurality of groove sections are provided to correspond to each of the optical elements. Still furthermore, the display apparatus 100 is further provided with the reflection section 60 having a reflection surface 61 which is positioned between the optical element and the liquid crystal display element 2, and which reflects the light that is emitted by the light source 10, towards the liquid crystal display element 2, and the reflection surface 61 is inclined with respect to the optical axis AX, and the optical path of the light from the optical axis AX leading up to the liquid crystal display element 2 is adapted to be thereby refracted at the reflection section 61.

It is to be noted that the present invention is not limited to the above embodiment and a variety of modifications are possible. Hereinafter, a modification example is shown.

Modification Example

Although the above description showed that the first elastic section 9b and the second elastic section 9c are integrally formed with the spring body 9, the present invention is not limited thereto. An elastic member having a similar function to that of each of the first elastic section 9b and the second elastic section 9c may be constructed separately. In addition, although the above description showed that the first elastic portion 9b is an example of projecting in the −Y direction, and may protrude in the +Y direction.

Although the example in which the reflection section 60 was composed of the planar mirror was shown hereinabove, the present invention is not limited thereto. The reflection surface 61 of the reflection section 60 may be formed in a concave shape, for example, a spherical face, a toroidal face, a conic face, or a free curved face. By doing so, the reflection section 60 attains a lens effect and can have a function to control light distribution to the liquid crystal display element 2 and thus, for example, even in a case where light collecting means is composed of one light collecting lens, light distribution can be precisely controlled. Also, in a case where the light collecting means is composed of two or more light collecting lenses, it is possible to reduce the number of light collecting lenses due to the similar advantageous effect and thus space saving and cost reduction can be achieved.

In addition, although the above description showed an example of the display light L being reflected on the windshield S of the vehicle C to thereby cause the user U to visually recognize the display image, and the present invention is not limited thereto. It may be that the display apparatus 100 is provided with a dedicated combiner thereof (an example of the transparent member), and the display light L is reflected by the combiner to thereby visually recognize a display image.

Further, although, in the above description, an example of a vehicle to which the display apparatus 100 is mounted was the vehicle C, the present invention is not limited thereto. The display apparatus 100 may be mounted to another vehicle such as a motor cycle, a construction machine, an agricultural machine, a ship, airplane or the like.

It is to be noted that the present invention is not limited by the above embodiment and drawings. Appropriate modifications (including deletion of a constituent element(s)) can occur to the embodiment and drawings without departing from the spirit of the present invention.

INDUSTRIAL APPLICABILITY

The present invention can be applied to a display apparatus like a head-up display apparatus for emitting display light representative of an image which is displayed by a liquid crystal display element toward a windshield (a transparent member) and then displaying a virtual image of the image by the display light that is reflected on the windshield.

DESCRIPTION OF REFERENCE NUMERALS

100 . . . Display Apparatus
1 . . . Backlight unit
10 . . . Light source
20 . . . Parallel light generating means
30 . . . Light box
30a, 30b . . . Flange sections
30c . . . Positioning section
40 . . . Lens array
40b . . . Flange section
40c . . . Positioning section
51 . . . First light collecting lens (light collecting lens)
51a, 51b . . . Flange sections
51c . . . Positioning section
51d . . . Incorrect assembling prevention section
52 . . . Second light collecting lens
60 . . . Reflection section
70 . . . Scattering plate
80 . . . Case body
81 . . . Upper opening (opening)
83 . . . Bottom section
O1, O2, O3 . . . Positioning holes (positioned sections)
O4 . . . Incorrect assembling prevention hole
84, 85 . . . Wall sections
841, 842, 843 . . . Groove sections
90 . . . Covering body
2 . . . Liquid crystal display element
3 . . . Display
9 . . . Spring body
9a . . . Sandwiching section 9b . . . First elastic section
9c . . . Second elastic section
AX . . . Optical axis
I . . . Illumination light
L . . . Display light
V . . . Virtual image
U . . . User

The invention claimed is:

1. A display apparatus to emit a display light representative of an image which is displayed by a liquid crystal display element towards a transparent member and then display a virtual image of the image by the display light that is reflected by the transparent member, the display apparatus comprising:
   a light source to emit light which illuminates the liquid crystal display element from an opposite side to the display side of the image;
   an optical element which are disposed between the light source and the liquid crystal display element and on the optical axis of the light source and
   a case body to house the optical element,
   a spring body which is mounted to the optical element, wherein
   the case body has:
   an opening which opens toward a first axial direction substantially orthogonal to the optical axis;
   a bottom section which is positioned on an opposite side to the opening in the first axial direction;
   groove sections, each of which is positioned between the opening and the bottom section, extends along the first axials direction, and is hollowed in a second axial direction orthogonal to the optical axis and the first axis,
   wherein the optical element has a protrusion section which protrudes in the second axial direction, and
   wherein the protrusion section is sandwiched between the groove sections, and is thereby housed in the case body while standing along the first axial direction, and
   wherein the spring body has:
      a first elastic section which is positioned between the protrusion section and the groove section, and which presses the protrusion section against the groove section; and
      a sandwiching section which sandwiches the protrusion section.

2. The display apparatus according to claim 1, further comprising:
   a covering body to close the opening;
   wherein the spring body having:
      a second elastic section which is positioned between the protrusion section and the covering body, and which presses the protrusion section against the bottom section.

3. The display apparatus according to claim 1,
   wherein the optical element is provided in plurality at intervals in a direction in which the optical axis is oriented,
   wherein positioning sections are provided at the bottom section's side of the optical element,
   wherein positioned sections at which the positioning section is to be positioned is provided at the bottom section, and
   wherein the positioned sections are formed in a line on the optical axis, when seen in the first axial direction.

4. The display apparatus according to claim 1,
   wherein the optical element is provided in plurality at intervals in a direction in which the optical axis is oriented, at least one of which is a light collecting lens to collect the light that is emitted by the light source, so as to correspond to a display region of the liquid crystal display element, and
   wherein the groove section is also provided in plurality to correspond to each of the optical elements.

5. The display apparatus according to claim 1, further comprising a reflection section which is positioned between the optical element and the liquid crystal display element, and which has a reflection surface to reflect the light that is emitted by the light source towards the liquid crystal display element,
   wherein the reflection surface is inclined with respect to the optical axis, and an optical path of the light from the light source leading up to the liquid crystal display element is adapted to be thereby refracted at the reflection section.

6. The display apparatus according to claim 1,
   wherein an incorrect assembling prevention section is provided at the bottom section's side of the optical element,
   wherein an incorrect assembling hole is provided at the bottom section.

* * * * *